(12) United States Patent
Cheng

(10) Patent No.: US 6,407,871 B1
(45) Date of Patent: Jun. 18, 2002

(54) OPTICAL DEVICE FOR ELIMINATING STRAY LIGHT

(75) Inventor: Chuan-Te Cheng, Hsin Chu (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 09/790,661

(22) Filed: Feb. 23, 2001

(30) Foreign Application Priority Data

Nov. 13, 2000 (TW) ........................................ 089124115

(51) Int. Cl.[7] ........................ G02B 26/08; G02B 26/00; G02B 9/00
(52) U.S. Cl. ........................ 359/740; 359/224; 359/291; 359/833; 359/739
(58) Field of Search ................................ 359/740, 739, 359/224, 291, 833, 618, 627, 629, 638, 639, 640; 348/742, 744, 748

(56) References Cited

U.S. PATENT DOCUMENTS

| | | | | |
|---|---|---|---|---|
| 5,428,408 A | * | 6/1995 | Stanton | ........................ 348/742 |
| 5,604,624 A | * | 2/1997 | Magarill | ........................ 359/224 |
| 6,215,547 B1 | * | 4/2001 | Ramanujan et al. | ........................ 355/67 |

* cited by examiner

Primary Examiner—Georgia Epps
Assistant Examiner—Timothy Thompson
(74) Attorney, Agent, or Firm—Winston Hsu

(57) ABSTRACT

An optical device for eliminating the stray light is provided at a stop of an illuminating system in an optical system of "digital light processing" (DLP). The optical system consists of a stop of an illuminating system, a "digital micromirror device" (DMD), a stop of a projection lens, and a screen while the stray light is a chromatic halo at the peripheral area on the screen. Wherein, the optical device includes a reflecting mirror designed of an adjustable angle and installed near periphery of the stop of the illuminating system. The chromatic halo is generated from the light beam at the periphery area. And, the light beam is reflected from the DMD and is transmitted into the stop of the projection lens, and then is projected on the screen. And, the reflecting mirror is used to reflect the light beam at the periphery area so as to divert the original transmitting path of the light beam such that the light beam is reflected from the DMD and is uniformly transmitted into the stop of the projection lens. Thus, the contrast ratio of the illuminating system is increased, and the quality of the output image is improved, and the efficiency of the DLP system is enhanced, and the luminance projected on the screen is improved.

17 Claims, 7 Drawing Sheets

OPTICAL DEVICE FOR ELIMINATING STRAY LIGHT

FIELD OF THE INVENTION

The invention relates to an optical device for eliminating the stray light, and particularly to an optical device diverting the original transmitting path of the stray light beam to improve the quality of the output image and the luminance projected on a screen.

DESCRIPTION OF THE RELATED ART

FIG. 1 is a schematic diagram of an conventional optical system employing a "digital micromirror device" (DMD) or a "reflecting type liquid crystal on silicon" (LCOS). FIG. 2 is an enlarged schematic diagram of a conventional chromatic halo generated by a stop of a projection lens with an aperture angle greater than 10 degree in coordination with the DMD chip with 10 degree turning angle. As shown in FIG. 1 and FIG. 2, the conventional optical system, using the DMD chip or the LCOS consists of a light source 10, a integration rod 12, a stop 20 of an illuminating system, a reflecting panel (DMD or LCOS) 30, a stop 40 of a projection lens, and a screen 50 for display.

By means of apparatus mentioned above, the light beam is transmitted from the light source 10 into the stop 20 of the illuminating system through the integration rod 12. Then, the light beam is transmitted into the stop 40 of the projection lens after being reflected form the reflecting panel 30 in order to project the image on the screen 50.

When the DMD chips with 10 degree turning angle is used for projection, the optical system only allows the light beam with an aperture angle of approximate 10 degree to enter the stop 40 of the projection lens for achieving the best luminance and contrast ratio of the image. And, that is due to the inherent characteristics of optics of the DMD 30 currently used. Despite of above mentioned, we could use a method to improve the luminance up to a certain level. Such method is implemented by using a stop of the projection lens with an aperture angle greater than 10 degree in coordination with the DMD chip 30 with 10 degree turning angle. However, on the other hand, the area A near the periphery of the stop of the projection lens with an aperture angle greater than 10 degree receives the additional light beam transmitted from the area B near the periphery of the stop 20 of the illuminating system. Such additional light beam is reflected from the DMD 30, and is transmitted into the stop 40 of the projection lens, and then is projected on the screen 50 that results in the chromatic halo 60. Such chromatic halo 60 always exists in any image so that it affects the quality of the output image. Especially when a black image is projected, since the existence of the chromatic halo results in an imperfect black image, the contrast ratio of the optical system is therefore affected. The chromatic halo 60 is resulted from the area A near the periphery of the stop of the projection lens with an aperture angle greater than 10 degree, and the area A is conjugated to the area B near the periphery of the stop 20 of the illuminating system. Thus, for any image being projected, the light beam at the area B is always projected by the projection lens through the DMD chip 30 (whether DMD is on or off) so as to generate the chromatic halo that causes flaws in the image projection. Furthermore, the second light source of point form at such area contributes a certain level in terms of the lumina output by the optical system. Therefore, if the light beam at this area is completely covered, the amount of lumina output by the optical system is greatly affected.

SUMMARY OF THE INVENTION

In view of the conventional flaws caused by the chromatic halo 60 in the image projection mentioned above, a small-sized reflecting mirror (with a flat surface or a curved surface) or a small-sized prism is provided at the area B according to the invention. Wherein, either a stop of a projection lens with an aperture angle greater than 10 degree is employed in coordination with a DMD chip 30 with 10 degree turning angle, or a stop of a projection lens with an aperture angle greater than 12 degree is employed in coordination with a DMD chip 30 with 12 degree turning angle. Thus, the light beam from the light source at this area is reflected by the reflecting mirror or is refracted by the prism so as to divert the original transmitting path of the light beam. Then, the light beam is reflected from the DMD 30 and is uniformly transmitted into the stop of the projection lens so as to increase the contrast ratio of the projection system and to improve the luminance output by the optical system. Such small-sized reflecting mirror or prism is installed near the periphery of the stop or the second light source of point form of the illuminating system so as to enhance the output lumina and to increase the contrast ratio of the optical system. The illuminating system, in which a stop of a projection lens with an aperture angle greater than 10 degree is used in coordination with a DMD chip 30 with 10 degree turning angle, or a stop of a projection lens with an aperture angle greater than 12 degree is used in coordination with a DMD chip 30 with 12 degree turning angle, and any design uses an aperture angle greater than that angle limited by the DMD chip, is implemented by the invention. Thereby, the luminance of the optical system is improved, and the best contrast ratio and the quality of image are achieved.

In order to achieve the object mentioned above, an optical device for eliminating the stray light ("stray light" is the common name for above mentioned chromatic halo 60) is provided according to the invention. The optical device is provided at a stop 20 of a illuminating system in an optical system of the "digital light processing" (DLP) that consists of the stop 20 of the illuminating system, a DMD 30, a stop 40 of a projection lens, and a screen 50. And, the stray light is the chromatic halo 60 at the peripheral area on the screen. Wherein, the optical device includes a reflecting mirror designed of an adjustable angle and installed at the area B near the periphery of the stop of the illuminating system. And, the chromatic halo generated by the light beam at the area B near the periphery of the stop of the illuminating system is reflected from the DMD and is transmitted into the stop of the projection lens, and then is projected on the screen 50. And, the reflecting mirror is used to reflect the light beam at the area B near the periphery of the stop of the illuminating system so as to divert the original transmitting path of the light beam. Thus, the light beam at area B is reflected from the DMD and is uniformly transmitted into the stop of the projection lens. Thereby, the contrast ratio of the optical system is increased, and the quality of the output image is improved, and the efficiency of the DLP system is enhanced, and the luminance projected on the screen 50 is improved.

These and other objects, features and advantages of the invention will become apparent with reference to the following description and accompanying drawings as follow.

DETAIL DESCRIPTION OF THE INVENTION

The aspects of embodiments of an optical device for eliminating the stray light according to the invention are illustrated with reference of the accompanying drawings as follow.

Figure 1:
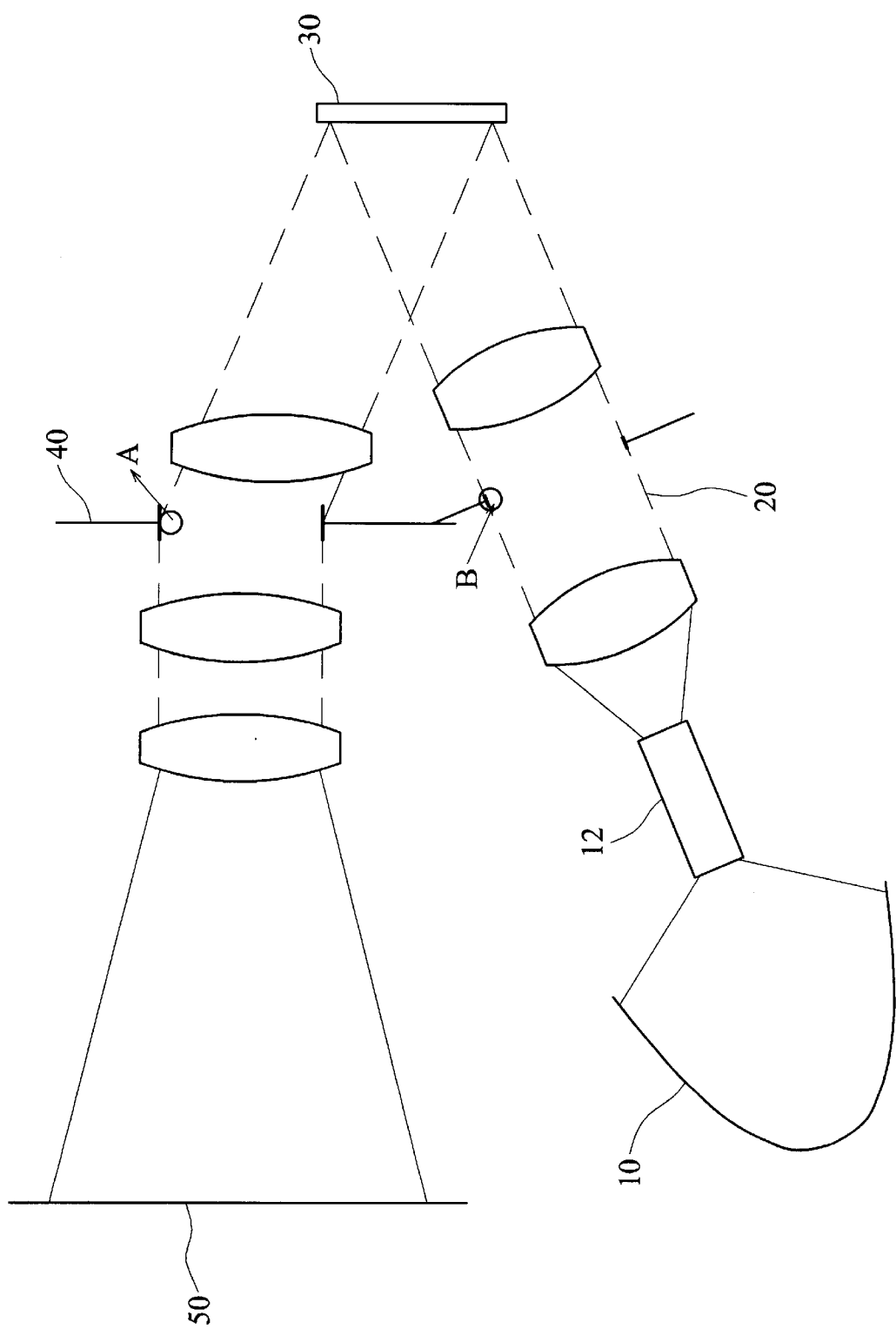
FIG. 1 is a schematic diagram of a conventional optical system employing a DMD or a LCOS.
Figure 2:
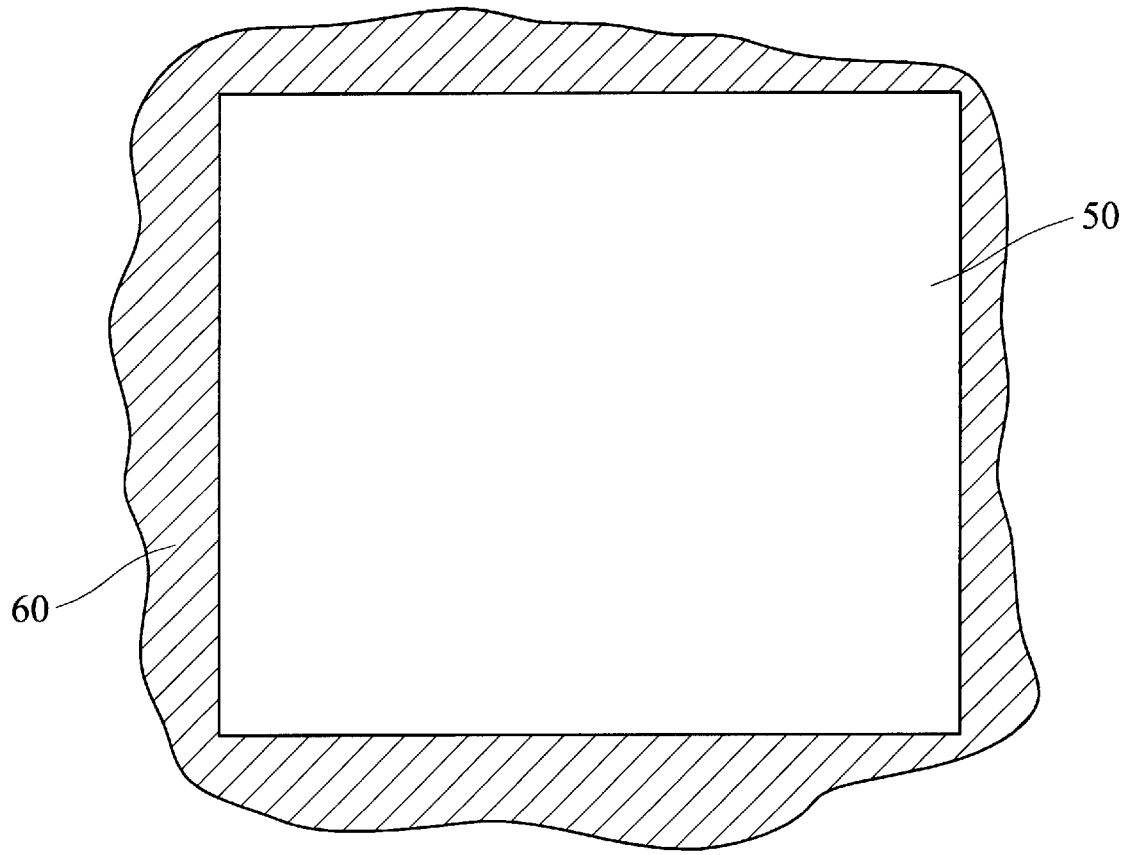
FIG. 2 is an enlarged schematic diagram of a conventional chromatic halo generated by a stop of a projection lens with an aperture angle greater than 10 degree in coordination with the DMD chip having 10 degree turning angle.
Figure 3:
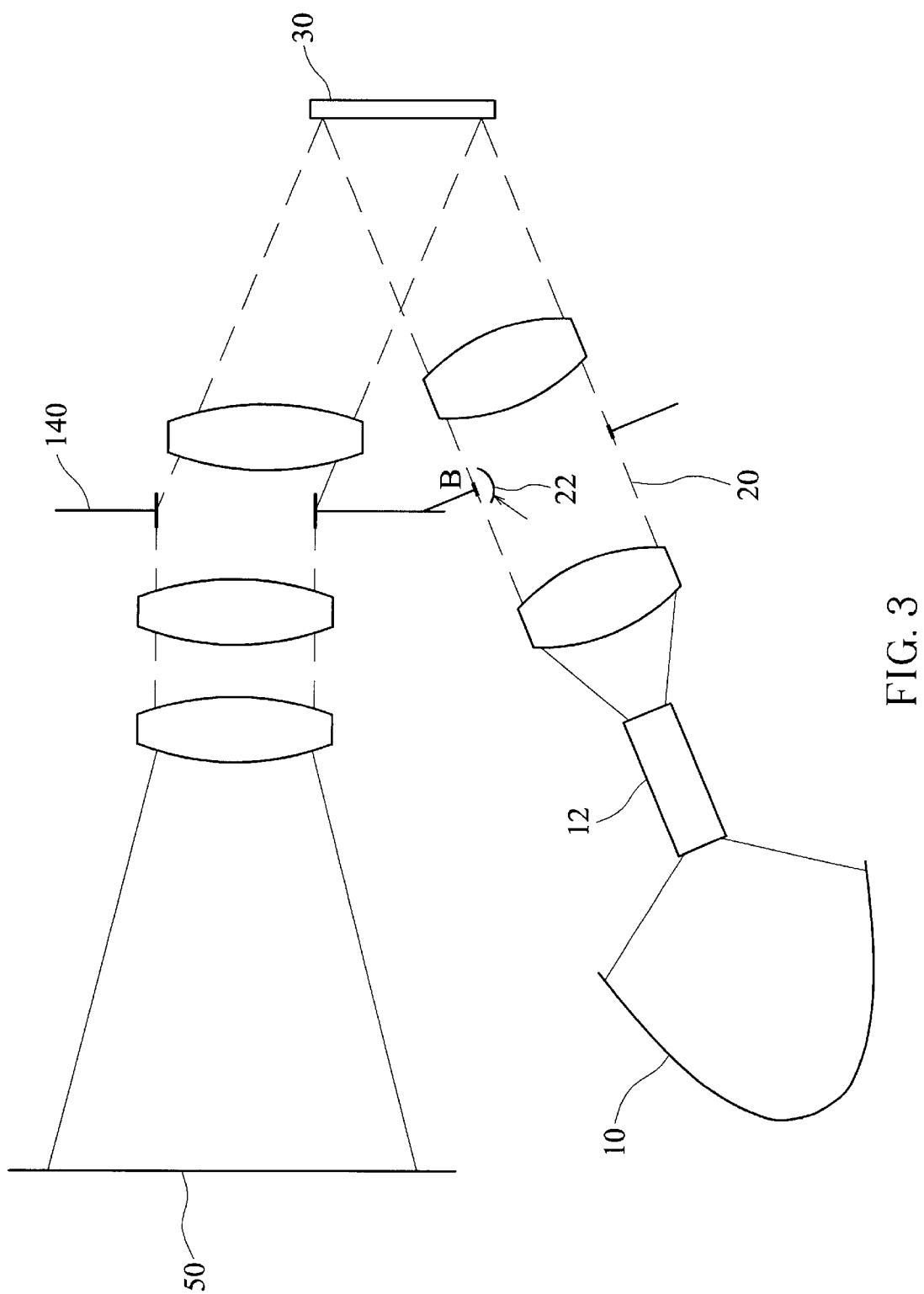
FIG. 3 is a schematic diagram for a small-sized reflecting mirror (with a flat surface or a curved surface) installed near the periphery of a stop of an illuminating system according to the invention.

FIG. 3 is a schematic diagram for a small-sized reflecting mirror (with a flat surface or a curved surface) installed near the periphery a stop of an illuminating system according to the invention. As shown in FIG. 3, the optical system according to the invention employs a "digital micromirror device" (DMD) or a "reflecting type liquid crystal on silicon" (LCOS). And, the optical system consists of a light source 10, an integration rod 12, a stop 20 of an illuminating system, a reflecting panel (DMD or LCOS) 30, a stop 140 of a projection lens with an aperture angle greater than 10 degree, and a screen 50 for display. The optical device for eliminating the stray light according to the invention is a reflecting mirror 22 installed at the stop 20 of the illuminating system while the stray light is the chromatic halo 60 at the peripheral area on the screen 50 (referring FIG. 2). The reflecting mirror 22 is designed of an adjustable angle and is installed at the area B near the stop 20 of the illuminating system. Wherein, the chromatic halo 60 (referring FIG. 2) is generated by the light beam at the area B near the stop 20 of the illuminating system and is reflected from the DMD (or LCOS) 30. Then, the light beam at the area B is transmitted into the stop 140 of the projection lens, whose aperture angle is greater than 10 degree, and then is projected on the screen 50. And, the reflecting mirror 22 is used to reflect the light beam at the area B so as to divert the original transmitting path of the light beam. Thus, the light beam at the area B is reflected from the DMD (or LCOS) 30 and is uniformly transmitted into the stop 140 of the projection lens, whose aperture angle is greater than 10 degree. Thereby, the contrast ratio of the optical system is increased, and the quality of the output image is improved, and the efficiency of the illuminating system is enhanced, and the luminance projected on the screen is improved.

Figure 4:
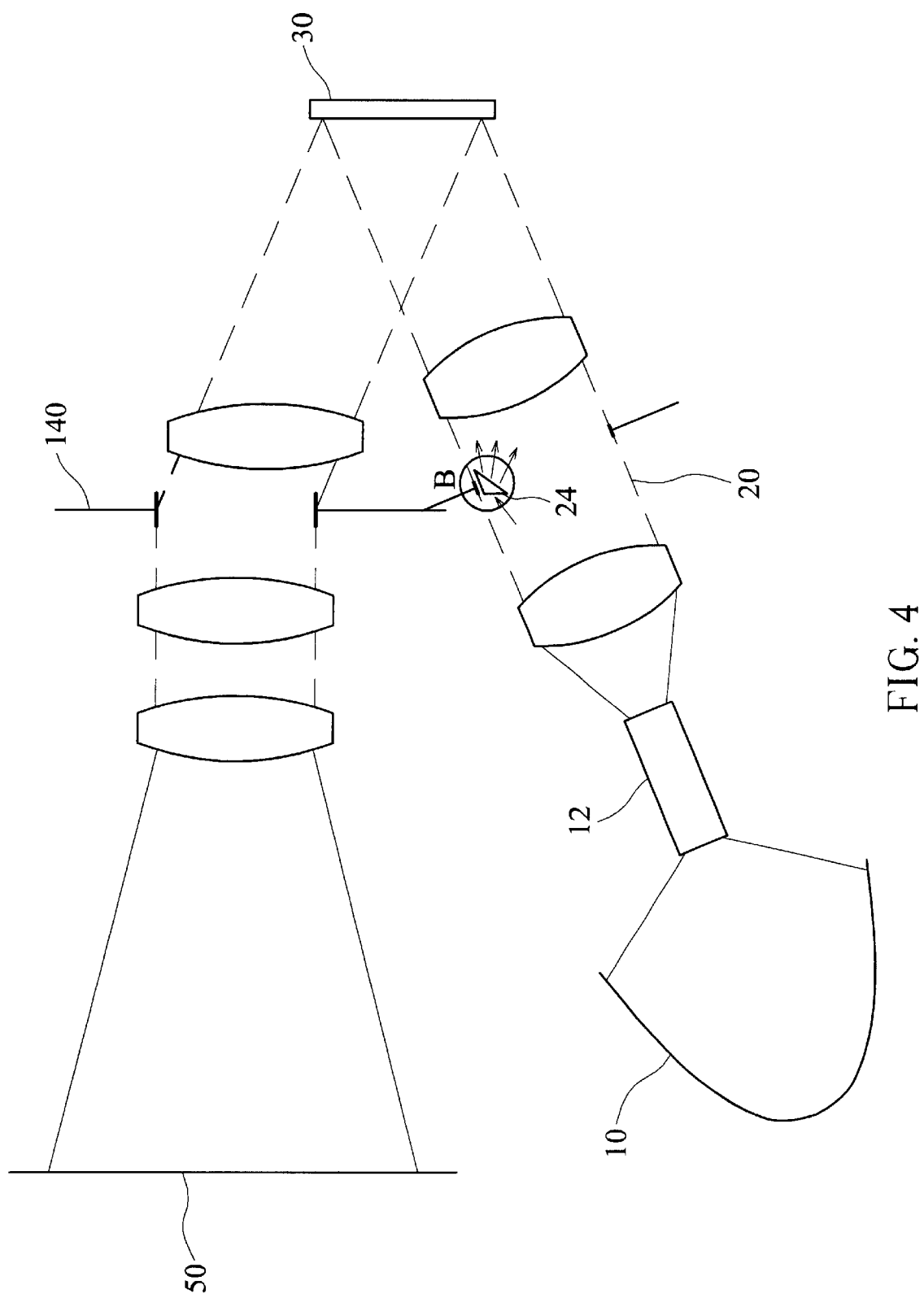
FIG. 4 is a schematic diagram for a small-sized prism installed near the periphery of a stop of an illuminating system according to the invention.

FIG. 4 is a schematic diagram for a small-sized prism installed near the periphery of a stop of an illuminating system according to the invention. As shown in FIG. 4, the optical system according to the invention employs a DMD or a LCOS. And, the optical system consists of a light source 10, an integration rod 12, a stop 20 of an illuminating system, a reflecting panel (DMD or LCOS) 30, a stop 140 of a projection lens with an aperture angle greater than 10 degree, and a screen 50 for display. The optical device for eliminating the stray light according to the invention is a prism 24 installed at the stop 20 of the illuminating system while the stray light is the chromatic halo 60 at the peripheral area on the screen 50 (referring FIG. 2). The prism 24 is designed of an adjustable angle and is installed at the area B near the stop 20 of the illuminating system. Wherein, the chromatic halo 60 (referring FIG. 2) is generated by the light beam at the area B near the stop 20 of the illuminating system and is reflected from the DMD (or LCOS) 30. Then, the light beam at the area B is transmitted into the stop 140 of the projection lens, whose aperture angle is greater than 10 degree, and then is projected on the screen 50. And, the prism 24 is used to refract the light beam at the area B so as to divert the original transmitting path of the light beam. Thus, the light beam at the area B is reflected from the DMD (LCOS) 30 and is uniformly transmitted into the stop 140 of the projection lens, whose aperture angle is greater than 10 degree. Thereby, the contrast ratio of the optical system is increased, and the quality of the output image is improved, and the efficiency of the illuminating system is enhanced.

Figure 5:
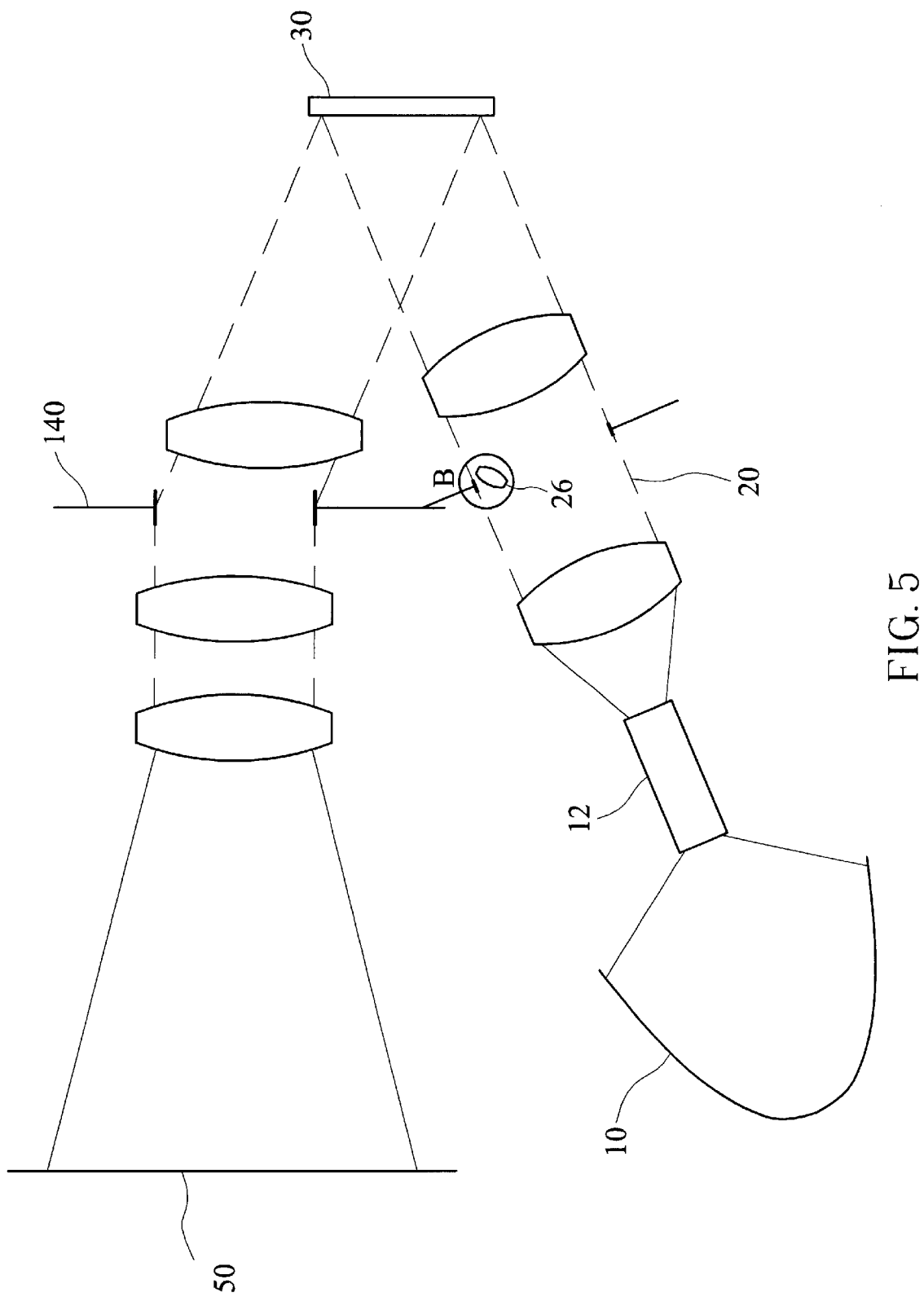
FIG. 5 is a schematic diagram for a small-sized lens set installed near the periphery of a stop of an illuminating system according to the invention.

FIG. 5 is a schematic diagram for a small-sized lens set installed near the periphery of a stop of an illuminating system according to the invention. As shown in FIG. 5, the optical system according to the invention employs a DMD or a LCOS. And, the optical system consists of a light source 10, an integration rod 12, a stop 20 of an illuminating system, a reflecting panel (DMD or LCOS) 30, a stop 140 of a projection lens with an aperture angle greater than 10 degree, and a screen 50 for display. The optical device for eliminating the stray light according to the invention is a set of lens 26 installed at the stop 20 of the illuminating system while the stray light is the chromatic halo 60 at the peripheral area on the screen 50 (referring FIG. 2). The lens set 26 is designed of an adjustable angle and is installed at the area B near the stop 20 of the illuminating system. Wherein, the chromatic halo 60 (referring FIG. 2) is generated by the light beam at the area B near the stop 20 of the illuminating system and is reflected from the DMD (or LCOS) 30. Then, the light beam at the area B is transmitted into the stop 140 of the projection lens, whose aperture angle is greater than 10 degree, and then is projected on the screen 50. And, the lens set 26 is used to refract the light beam at the area B so as to divert the original transmitting path of the light beam. Thus, the light beam at the area B is reflected from the DMD (or LCOS) 30 and is uniformly transmitted into the stop 140 of the projection lens, whose aperture angle is greater than 10 degree. Thereby, the contrast ratio of the optical system is increased, and the quality of the output image is improved, and the efficiency of the illuminating system is enhanced.

Figure 6:
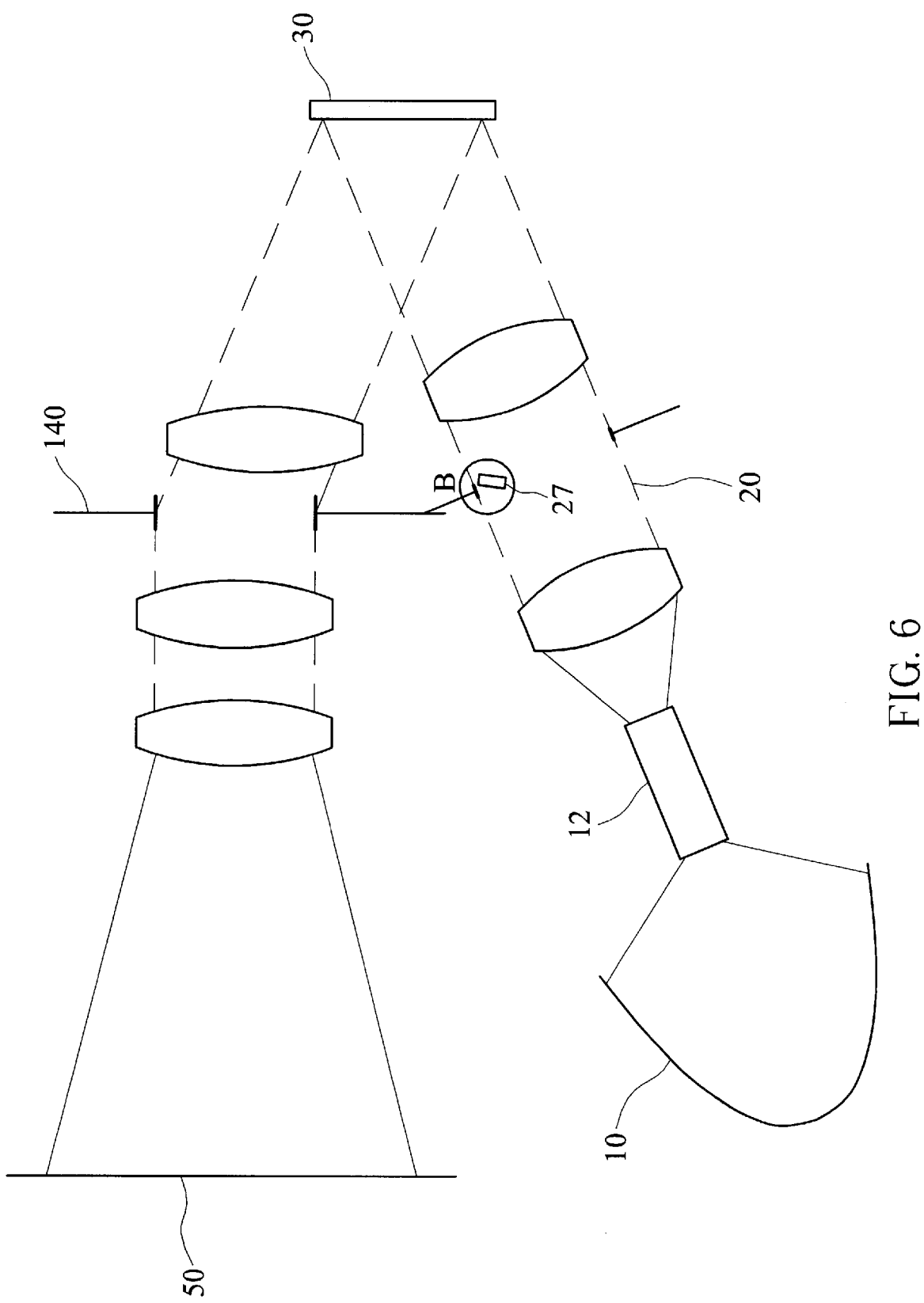
FIG. 6 is a schematic diagram for a small-sized mask installed near the periphery of a stop of an illuminating system according to the invention.

FIG. 6 is a schematic diagram for a small-sized mask installed near the periphery of a stop of an illuminating system according to the invention. As shown in FIG. 5, the optical system according to the invention employs a DMD or a LCOS. And, the optical system consists of a light source 10, an integration rod 12, a stop 20 of an illuminating system, a reflecting panel (DMD or LCOS) 30, a stop 140 of a projection lens with an aperture angle greater than 10 degree, and a screen 50 for display. The optical device for eliminating the stray light according to the invention is a mask 27 installed at the stop 20 of the illuminating system while the stray light is the chromatic halo 60 at the peripheral area on the screen 50 (referring FIG. 2). The mask 27 is designed of an adjustable angle and is installed at the area B near the stop 20 of the illuminating system. Wherein, the chromatic halo 60 (referring FIG. 2) is generated by the light beam at the area B near the stop 20 of the illuminating system and is reflected from the DMD (or LCOS) 30. Then, the light beam at the area B is transmitted into the stop 140 of the projection lens, whose aperture angle is greater than 10 degree, and then is projected on the screen 50. And, the mask 27 is used to stop the light beam at the area B so that the light beam is not reflected from the DMD (or LCOS) 30 and is not uniformly transmitted into the stop 140 of the projection lens, whose aperture angle is greater than 10 degree. Thereby, the contrast ratio of the optical system is increased, and the quality of the output image is improved, and the efficiency of the illuminating system is enhanced.

Figure 7:
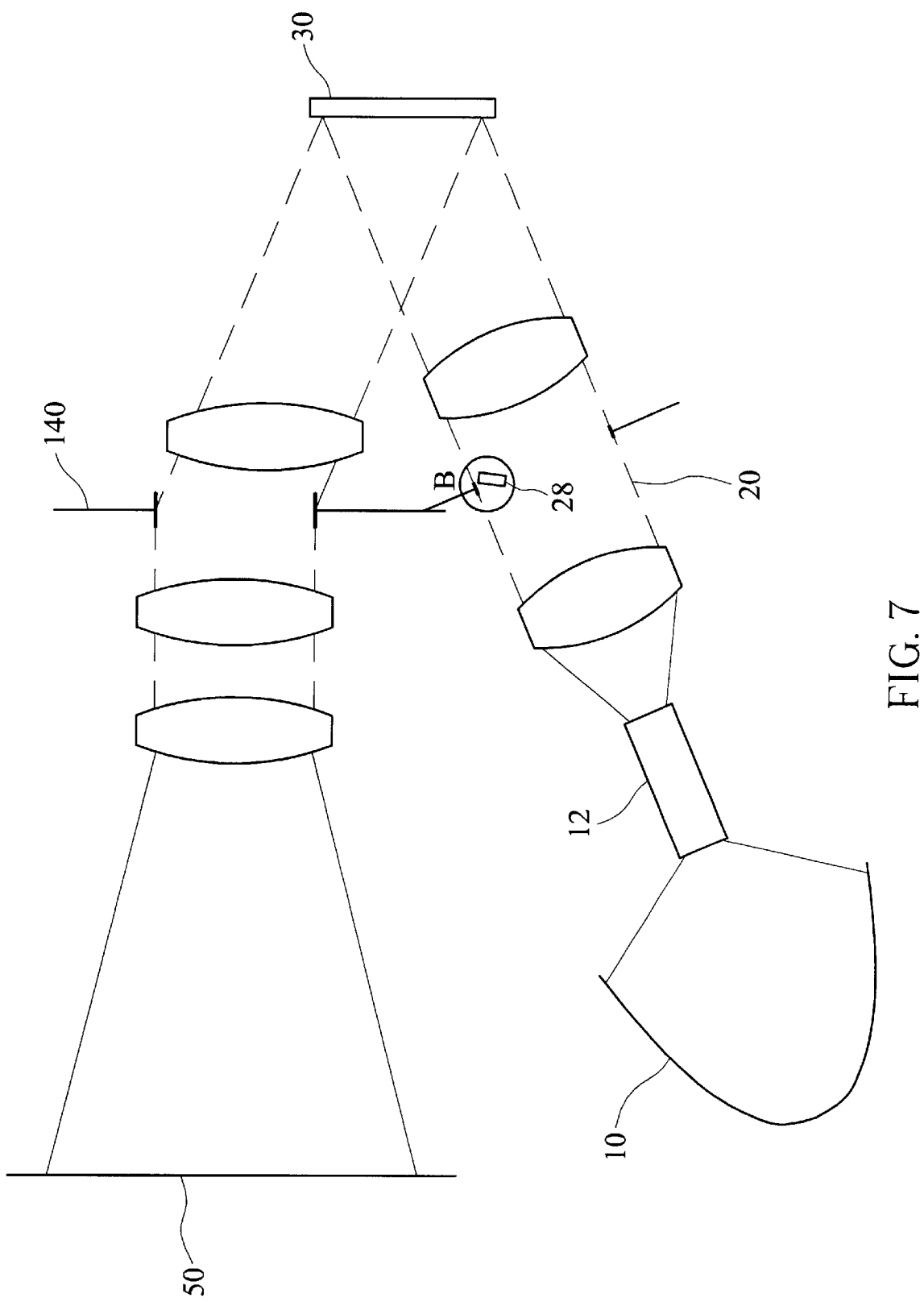
FIG. 7 is a schematic diagram for a small-sized filter installed near the periphery of a stop of an illuminating system according to the invention.

FIG. 7 is a schematic diagram for a small-sized filter installed near the periphery of a stop of an illuminating system according to the invention. As shown in FIG. 7, the optical system according to the invention employs a DMD or a LCOS. And, the optical system consists of a light source 10, an integration rod 12, a stop 20 of an illuminating system, a reflecting panel (DMD or LCOS) 30, a stop 140 of a projection lens with an aperture angle greater than 10 degree, and a screen 50 for display. The optical device for eliminating the stray light according to the invention is a filter 28 installed at the stop 20 of the illuminating system while the stray light is the chromatic halo 60 at the peripheral area on the screen 50 (referring FIG. 2). The filter 28 is designed of an adjustable angle and is installed at the area B near the stop 20 of the illuminating system. Wherein, the chromatic halo 60 (referring FIG. 2) is generated by the light beam at the area B near the stop 20 of the illuminating system and is reflected from the DMD (or LCOS) 30. Then, the light beam at the area B is transmitted into the stop 140 of the projection lens, whose aperture angle is greater than 10 degree, and then is projected on the screen 50. And, the filter 28 is used to filter the chromatic halo 60 in the irregular shape at the peripheral area of the image projected so as to reduce the flaws caused by the chromatic halo in the image projected on the screen. Thereby, the quality of the output image is improved.

The embodiments mentioned above in detail are to describe the invention but not to restrict the invention. It should be understood that various alternatives to the structures described herein may be employed in practicing the invention. It is intended that the following claims define the invention and that the structure within the scope of these claims and their equivalents be covered thereby.

What is claimed is:

1. An optical device, for eliminating the stray light, provided at a stop of an illuminating system in an optical system of "digital light processing" (DLP) including the stop of an illuminating system, a "digital micromirror device" (DMD), a stop of a projection lens, and a screen, where the stray light is a chromatic halo at the peripheral area on the screen, wherein said optical device comprising:

a reflecting mirror designed of an adjustable angle and installed near periphery of the stop of the illuminating system;

wherein, the chromatic halo is generated by the light beam that is near the stop of the illuminating system and is reflected from the DMD into the stop of the projection lens, and then is projected on the screen, while said reflecting mirror is used to reflect the light beam at the periphery area so as to divert the original transmitting path of the light beam such that the light beam at the periphery area is reflected from the DMD and is uniformly transmitted into the stop of the projection lens so as to increase the contrast ratio of the illuminating system, to improve the quality of the output image, to enhance the efficiency of the DLP system, and to improve the luminance of the image projected on the screen.

2. The optical device for eliminating the stray light of claim 1, wherein the DMD is either a micromirror with 10 degree turning angle or a micromirror with 12 degree turning angle while the aperture angle of the corresponding stop of the projection lens is greater than 10 or 12 degree respectively.

3. The optical device for eliminating the stray light of claim 2, wherein said reflecting mirror is the mirror with either a flat surface or a curved surface.

4. An optical device, for eliminating the stray light, provided at a stop of an illuminating system in an optical system of DLP including the stop of an illuminating system, a DMD, a stop of a projection lens, and a screen, where the stray light is a chromatic halo at the peripheral area on the screen, wherein said optical device comprising:

a prism designed of an adjustable angle and installed near periphery of the stop of the illuminating system;

wherein, said prism is used to refract the light beam at the periphery area so as to divert the original transmitting path of the light beam such that the light beam at the periphery area is reflected from the DMD and is uniformly transmitted into the stop of the projection lens so as to increase the contrast ratio of the optical system, to improve the quality of the output image, and to enhance the efficiency of the illuminating system.

5. The optical device for eliminating the stray light of claim 4, wherein the DMD is either a micromirror with 10 degree turning angle or a micromirror with 12 degree turning angle while the aperture angle of the corresponding stop of the projection lens is greater than 10 or 12 degree respectively.

6. An optical device, for eliminating the stray light, provided at a stop of an illuminating system in an optical system of DLP including the stop of an illuminating system, a DMD, a stop of a projection lens, and a screen, where the stray light is a chromatic halo at the peripheral area on the screen, wherein said optical device comprising:

a set of lens designed of an adjustable angle and installed near periphery of the stop of the illuminating system;

wherein, said lens set is used to refract the light beam at the periphery area so as to divert the original transmitting path of the light beam such that the light beam at the periphery area is reflected from the DMD and is uniformly transmitted into the stop of the projection lens so as to increase the contrast ratio of the optical system, to improve the quality of the output image, and to enhance the efficiency of the illuminating system.

7. The optical device for eliminating the stray light of claim 6, wherein the DMD is either a micromirror with 10 degree turning angle or a micromirror with 12 degree turning angle while the aperture angle of the corresponding stop of the projection lens is greater than 10 or 12 degree respectively.

8. An optical device, for eliminating the stray light, provided at a stop of an illuminating system in an optical system of DLP including the stop of an illuminating system, a DMD, a stop of a projection lens, and a screen, where the stray light is a chromatic halo at the peripheral area on the screen, wherein said optical device comprising:

a mask designed of an adjustable angle and installed near periphery of the stop of the illuminating system;

wherein, said mask is used to stop the light beam at the periphery area so as to prevent the light beam at the periphery area from being reflected from the DMD and being uniformly transmitted into the stop of the projection lens so as to increase the contrast ratio of the optical system, to improve the quality of the output image, and to enhance the efficiency of the illuminating system.

9. The optical device for eliminating the stray light of claim 8, wherein the DMD is either a micromirror with 10 degree turning angle or a micromirror with 12 degree turning angle while the aperture angle of the corresponding stop of the illuminating system is greater than 10 or 12 degree respectively.

10. An optical device, for eliminating the stray light, provided in an optical system of DLP including a stop of an illuminating system, a DMD, a stop of a projection lens, and a screen, where the stray light is a chromatic halo at the peripheral area on the screen, wherein said optical device comprising:

a filter designed of an adjustable angle and installed near periphery of the stop of the illuminating system;

wherein, said filter is used to filter the chromatic halo in the irregular shape at the peripheral area of the output image so as to reduce the flaws caused by the chromatic halo in the output image being projected on the screen and to improve the quality of the output image.

11. The optical device for eliminating the stray light of claim 10, wherein the DMD is either a micromirror with 10 degree turning angle or a micromirror with 12 degree turning angle while the aperture angle of the corresponding stop of the projection lens is greater than 10 or 12 degree respectively.

12. An optical device, for eliminating the stray light, provided at a stop of an illuminating system in an optical system including the stop of an illuminating system, a "reflecting type liquid crystal on silicon" (LCOS), a stop of a projection lens, and a screen, where the stray light is a chromatic halo at the peripheral area on the screen, wherein said optical device comprising:

a reflecting mirror designed of an adjustable angle and installed near periphery of the stop of the illuminating system;

wherein, the chromatic halo is generated by the light beam that is near the stop of the illuminating system and is reflected from the LCOS into the stop of the projection lens and then is projected on the screen, while said reflecting mirror is used to reflect the light beam at the periphery area so as to divert the original transmitting path of the light beam such that the light beam at the periphery area is reflected from the LCOS and is uniformly transmitted into the stop of the projection lens so as to increase the contrast ratio of the optical system, to improve the quality of the output image, to enhance the efficiency of the optical system, and to improve the luminance projected on the screen.

13. The optical device for eliminating the stray light of claim 12, wherein said reflecting mirror is the mirror with either a flat surface or a curved surface.

14. An optical device, for eliminating the stray light, provided at a stop of an illuminating system in an optical system including the stop of an illuminating system, a LCOS, a stop of a projection lens, and a screen, where the stray light is a chromatic halo at the peripheral area on the screen, wherein said optical device comprising:

a prism designed of an adjustable angle and installed near periphery of the stop of the illuminating system;

wherein, said prism is used to refract the light beam at the periphery area so as to divert the original transmitting path of the light beam such that the light beam at the periphery area is reflected from the LCOS and is uniformly transmitted into the stop of the projection lens so as to increase the contrast ratio of the optical system, to improve the quality of the output image, and to enhance the efficiency of the illuminating system.

15. An optical device, for eliminating the stray light, provided at a stop of an illuminating system in an optical system including the stop of an illuminating system, a LCOS, a stop of a projection lens, and a screen, where the stray light is a chromatic halo at the peripheral area on the screen, wherein said optical device comprising:

a set of lens designed of an adjustable angle and installed near periphery of the stop of the illuminating system;

wherein, said lens set is used to refract the light beam at the periphery area so as to divert the original transmitting path of the light beam such that the light beam at the periphery area is reflected from the LCOS and is uniformly transmitted into the stop of the projection lens so as to increase the contrast ratio of the optical system, to improve the quality of the output image, and to enhance the efficiency of the illuminating system.

16. An optical device, for eliminating the stray light, provided at a stop of an illuminating system in an optical system including the stop of an illuminating system, a LCOS, a stop of a projection lens, and a screen, where the stray light is a chromatic halo at the peripheral area on the screen, wherein said optical device comprising:

a mask designed of an adjustable angle and installed near periphery of the stop of the illuminating system;

wherein, said mask is used to stop the light beam at the periphery area so as to prevent the light beam at the periphery area from being reflected from the LCOS and being uniformly transmitted into the stop of the projection lens so as to increase the contrast ratio of the optical system, to improve the quality of the output image, and to enhance the efficiency of the illuminating system.

17. An optical device, for eliminating the stray light, provided at a stop of an illuminating system in an optical system including the stop of an illuminating system, a LCOS, a stop of a projection lens, and a screen, where the stray light is a chromatic halo at the peripheral area on the screen, wherein said optical device comprising:

a filter designed of an adjustable angle and installed near periphery of the stop of the illuminating system;

wherein, said filter is used to filter the chromatic halo in the irregular shape at the peripheral area of the output image so as to reduce the flaws caused by the chromatic halo in projecting the output image on the screen and to improve the quality of the output image.

* * * * *